May 5, 1970     P. V. FERRIDAY     3,509,860
INTERNAL COMBUSTION ENGINES
Filed June 24, 1968     2 Sheets-Sheet 1

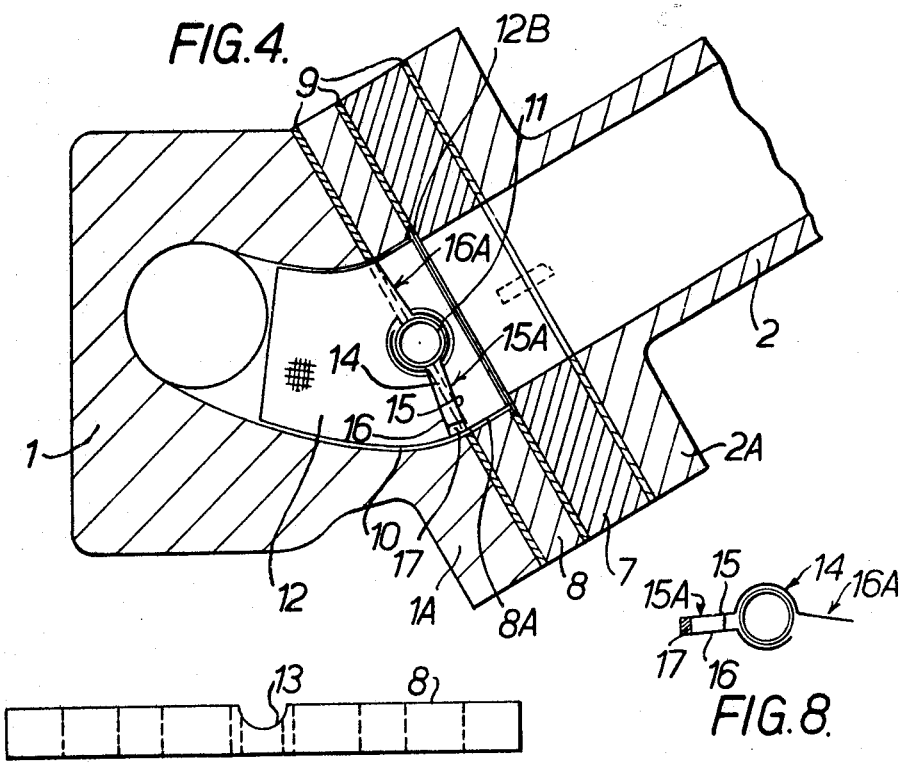
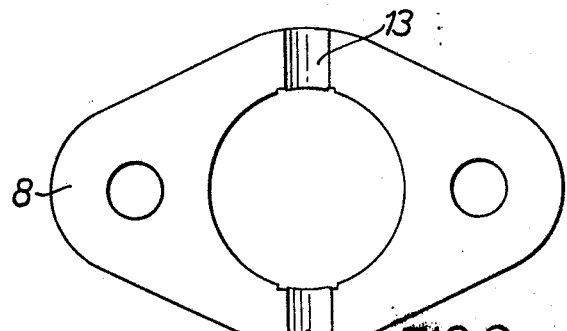
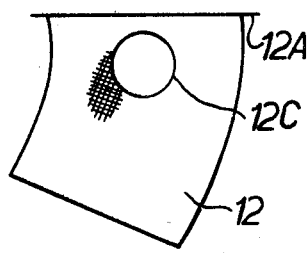
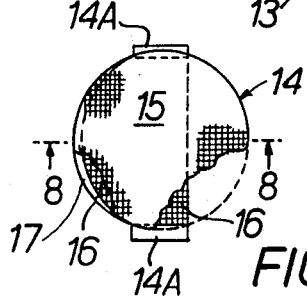

United States Patent Office 3,509,860
Patented May 5, 1970

3,509,860
INTERNAL COMBUSTION ENGINES
Percival Victor Ferriday, London, England, assignor to Carburetion Units Limited, London, England, a British company
Filed June 24, 1968, Ser. No. 739,258
Claims priority, application Great Britain, June 26, 1967, 29,355/67
Int. Cl. F02m 29/04, 31/08
U.S. Cl. 123—122                              6 Claims

ABSTRACT OF THE DISCLOSURE

In an internal combustion engine, means for improving fuel combustion and reducing air pollutants, comprising screen means pivotally mounted in a passageway between the carburetor and the intake manifold of the engine to thoroughly break up droplets of fuel passing from the carburetor to the intake manifold at idling and low speeds, the means being automatically pivoted at higher engine speeds to present less resistance to the fuel/air mixture passing from the carburetor to the intake manifold.

---

Figure 1:
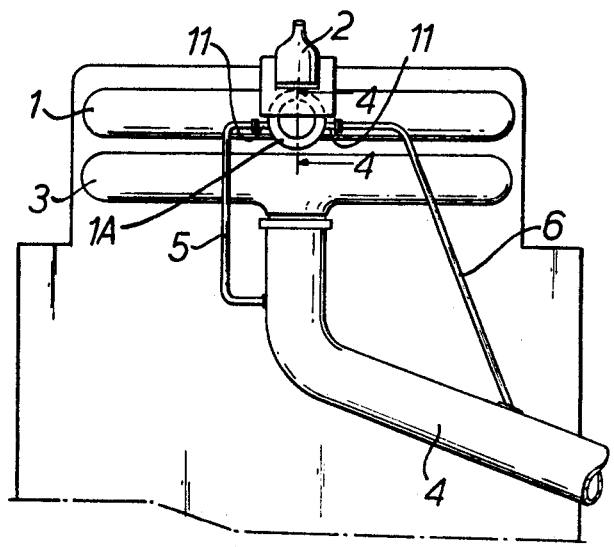

This invention relates to internal combustion engines, of the general type having one or more than one combustion chamber (for instance a cylinder of a piston and cylinder engine); means for supplying air to the combustion chamber; means for producing finely divided liquid fuel from a supply of liquid fuel, and means for mixing the finely divided fuel with the air to produce a fuel/air mixture (for example one or more than one carburettor); and passage means (for example an induction manifold) for conveying the fuel/air mixture to the or each combustion chamber.

For many years than has existed the problem, in an engine of this general type, of improving fuel consumption, either by reducing fuel consumption for a given power output, or by increasing power output for a given fuel consumption, or both. Other desirable requirements that have long been sought are to improve the starting of the engine and to reduce wear of the engine.

More recently there has been recognised the problem of reducing the quantity of harmful constituents in the exhaust gases of the engine, and particularly the need for reducing emission of carbon monoxide and unburnt hydrocarbons.

It is therefore an object of this invention to provide a solution as far as practicable, to these problems, and in particular to provide an engine in which good fuel consumption is combined with acceptable levels of emission of carbon monoxide and unburnt hydrocarbons.

According to this invention an internal combustion engine comprises: at least one combustion chamber; means for supplying air to the combustion chamber; means for producing finely divided liquid fuel from a supply of liquid fuel; means for mixing the finely divided fuel with the air to produce a fuel/air mixture; passage means for conveying the fuel/air mixture to the combustion chamber or chambers, characterized in that a perforated diffusing screen for diffusing the fuel/air mixture is disposed in the passage means, the screen being movable between a first position, in which the screen extends across the passage means so that the fuel/air mixture must pass through the substantially whole area of the perforated screen, and a second position in which the screen presents little obstruction to the fuel/air mixture.

The screen is preferably circular and rockably mounted on pivot means whose axis is at right angles to the axis of the passage means at the location of the screen therein.

The pivot means may be a tube which extends across the passage means and on which the screen is rockably carried. The circular screen is preferably made up of a perforated circular disc and a perforated semi-circular plate, the disc and the plate being spaced from one another and substantially parallel. The screen is preferably automatically returnable to the first position, for example by a weight fixed to the edge of the screen. The pivot tube may be heated so as to heat the fuel/air mixture, and further it may be heated by being connected to the exhaust system of the engine.

The screen is preferably disposed in the induction manifold of the engine at the location where a carburettor is connected to the induction manifold. It is desirable that, downstream of the screen, the wall of the passage means should be provided with means, for instance a shaped wire mesh sleeve, to prevent liquid fuel running along the wall.

Figure 2:
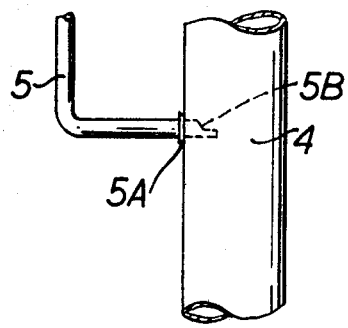
Figure 3:
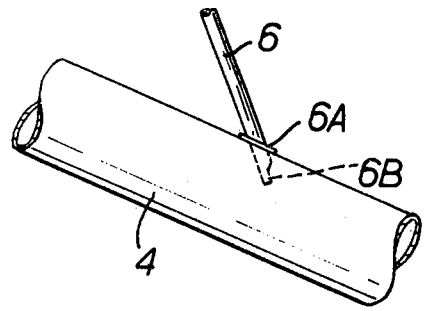

The invention will now be described in more detail by way of example, with reference to the accompanying drawings in which:

FIG. 1 is a purely diagrammatic side elevation of an internal combustion engine;
FIGS. 2 and 3 are enlarged details of FIG. 1;
FIG. 4 is an enlarged detail section on plane 4—4 of FIG. 1;
FIGS. 5 and 6 are respectively a side elevation and plan of a clamping plate;
FIG. 7 is a plan view, partly broken away, of a diffusing screen;
FIG. 8 is a section on plane 8—8 of FIG. 7; and
FIG. 9 is an elevation of a diffusing tube.

Referring to FIG. 1 an internal combustion engine is shown having an induction manifold 1, a carburettor 2, an exhaust manifold 3, an exhaust pipe 4, and tubes 5 and 6 for conveying hot exhaust gas respectively to and from an extension 1A of the induction manifold 1.

FIG. 2 shows the connection of the tube 5 to the exhaust pipe 4 at a brazed joint 5A. The tube 5 extends into the interior of the pipe 4 as indicated in dotted lines, its end being as shown of scoop-like form 5B, to ensure that hot exhaust gas enters the tube 5.

FIG. 3 shows the connection of the tube 6 to the exhaust pipe 6 at a brazed joint 6A. The tube 6 extends into the interior of the pipe 4 as indicated in dotted lines, its end being as shown of scoop-like form 6B, to assist return of exhaust gas to the pipe 4.

The tubes 5 and 6 are connected respectively to each end of a tube 11 which extends through the extension 1A, as will be described. The purpose of the above-described arrangement for diverting some of the hot exhaust gas is to provide for heating the fuel/air mixture leaving the carburettor 2.

Referring to FIG. 4 a heat resistant packing 7 and a tube clamping plate 8 are fixed by bolts (not shown) between the extension 1A of the induction manifold 1 and the lower end flange 2A of the carburettor 2. Airtightness is ensured by gaskets 9. The induction manifold 1 communicates with the carburettor 2 by means of the extension 1A, which is in the form of a curved passage 10 and forms part of the manifold 1.

Partly in the passage 10 and in bore 8A of plate 8 is loosely fitted a shaped diffuser tube 12 of wire mesh, for example of 30 x 30 copper mesh. This tube 12 is seen in FIG. 9; it has a locating flange 12A which fits in, and is retained by, an annular groove 12B between the packing 7 and clamping plate 8. This diffuser tube 10 prevents fuel collecting on and running along the wall of the curved passage 10.

Transversely and diametrally of the passage 10 and bore 8A the tube 11 is fitted; it is received in a pair of aligned, semi-circular grooves (not shown) in the outer face of the induction manifold casting and also in like grooves 13 in the plate 8 (see FIGS. 5 and 6); thus the plate 8 clamps the tube 11 in the two sets of grooves, so that it extends across the flow path of fuel/air mixture from the carburettor 2 to the induction manifold 1.

Rockably mounted on the tube 11 is a perforated diffuser screen 14, in the form of a butterfly. This screen includes a pair of spaced rings 14A (FIG. 7) which encircle the tube 11 freely, to permit rocking thereon of the screen 14. The perforated screen 14 is made up of two plates 15, 16 of copper wire mesh; plate 15 is upstream (in the direction of fuel/air mixture flow) and is circular (see FIG. 7). In the closed state shown in FIG. 4, it extends across the area of flow. Plate 16 is substantially semi-circular and is downstream of plate 15 extending across approximately half the area of flow in the FIG. 4 state. FIGS. 7 and 8 show the construction of the screen 14. The diffuser tube 12 has opposed holes 12C (FIG. 9) through which pass the tube 11. The screen 14 has a lead weight 17 fixed to the lower edge, as shown.

Referring again to FIG. 4, when the engine is running, fuel/air mixture passing from the carburettor 2 to the manifold 1 encounters the resistance of the perforated butterfly diffusing screen 14. The construction of the screen 14 is such that it provides generally semicircular, single mesh part 16A (FIG. 8) and a generally semicircular, double mesh part 15A. The part 15A thus offers greater resistance to the flow, and, according to the speed of flow, the screen 14 is rocked about the axis of the tube 11, to a greater or less degree, from the FIG. 4 position towards a fully open position in which the screen is substantially parallel to the axis of the bore 8A. Thus the area of obstruction caused by the screen 14 can vary according to the speed of flow. The purpose of the weight 17 is to ensure positive return of the screen 14 to the FIG. 4 position.

The screen 14 is operative in the FIG. 4 position to diffuse the fuel by breaking up the fine fuel droplets when the engine is running slowly; as engine speed increases combustion improves and the need for diffusion is reduced and under these conditions the area of the screen 14, as seen in the direction of flow, is reduced.

If desired a pre-heater coil (not shown) can be arranged round the pipe 11 outside the induction manifold; by this means the advantageous effect of heating the pipe 11 may be obtained before the engine has warmed up.

The invention is not limited to the embodiment described above. For example, although the two-part diffusing screen 14 is preferred, the differential pressure effect could be obtained by other means, for example by spring loading of a single plate screen.

Also other arrangements are possible instead of the rockable butterfly diffusing screen 14; for example a screen having two generally semicircular leaves, each separately rockably mounted, could be used. In the normal position the leaves (of copper mesh) would extend in a transverse plane across the flow path, but with increased flow speed they would both be rocked away from the normal position.

Although in the embodiment described above a packing 7 and a clamping plate 8 are used, it would be possible to dispense with the plate 8 and the two sets of grooves which receive the pipe 11. Instead, the packing 7 could be thicker and could be bored to receive and retain the pipe 11. It is necessary to ensure that the butterfly diffusing screen 14 does not foul the throttle butterfly of the carburettor, but on the other hand it is possible to arrange the two butterflies so that in the fully open throttle position they touch; in this state the throttle butterfly acts as a stop for the butterfly screen and prevents flutter of the latter. Alternatively a separate stop could be provided for this purpose.

The diffuser tube 12 is shown as of mesh; this is preferred, but a tube of imperforate sheet material could be used.

The device of the invention may be adapted for use with various kinds of induction manifold and various kinds of carburettor. It could also be used with an internal combustion engine having fuel injection into an air inlet passage.

What is claimed is:
1. An internal combustion engine comprising:
   at least one combustion chamber;
   means for supplying air to the combustion chamber;
   means for producing finely divided liquid fuel from a supply of liquid fuel;
   means for mixing the finely divided fuel with the air to produce a fuel/air mixture;
   passage means for conveying the fuel/air mixture to the combustion chamber or chambers, characterized in that a perforated diffusing screen for diffusing the fuel/air mixture is disposed in the passage means, the screen being movable between a first position, in which the screen extends across the passage means so that the fuel/air mixture must pass through the substantially whole area of the perforated screen, and a second position in which the screen presents little obstruction to the fuel/air mixture,
   said diffusing screen comprising generally flat, spaced apart, first and second perforated parts, the first part in the said first position extending over substantially the whole cross section of the passage means in a direction substantially normal to the flow of fuel/air mixture and the second part extending across not more than about half the said cross section of said passage means.

2. An engine according to claim 1 characterized in that the screen is circular and comprises a perforated circular disc with a perforated semi-circular plate spaced therefrom and substantially parallel thereto.

3. An engine according to claim 1 characterized in that said screen is freely rockably mounted on a pivot tube extending across said passage means and said tube is heated.

4. An engine according to claim 3 characterized in that the tube is connected in the engine exhaust system whereby hot exhaust gas is passed through the tube to heat the fuel/air mixture in the passage means.

5. An engine according to claim 1 characterized in that the said means for returning the screen comprises a weight fixed at the edge of the screen.

6. An engine according to claim 1 characterized in that downstream of the screen the wall of the passage means is provided with means to prevent liquid fuel running along the wall, said means comprising a perforated tube disposed close to the wall of the passage means.

References Cited

UNITED STATES PATENTS

| 1,269,252 | 6/1918 | Brown | 123—122 |
| 2,251,999 | 8/1941 | Greco | 123—141 |
| 2,684,059 | 7/1954 | Schneider | 123—141 |

FOREIGN PATENTS

| 476,522 | 5/1929 | Germany. |
| 637,493 | 2/1962 | Canada. |
| 982,461 | 2/1965 | Great Britain. |

MARK M. NEWMAN, Primary Examiner

D. HART, Assistant Examiner

U.S. Cl. X.R.

123—141